COLOR TELEVISION RECEIVER CIRCUITS

Filed July 7, 1955 3 Sheets-Sheet 1

INVENTOR.
ALBERT MACOVSKI
BY
[signature]
ATTORNEY

May 24, 1960 A. MACOVSKI 2,938,072

COLOR TELEVISION RECEIVER CIRCUITS

Filed July 7, 1955

3 Sheets-Sheet 2

INVENTOR.
ALBERT MACOVSKI
BY
[signature]
ATTORNEY

INVENTOR.
ALBERT MACOVSKI
BY
ATTORNEY

United States Patent Office 2,938,072

Patented May 24, 1960

2,938,072

COLOR TELEVISION RECEIVER CIRCUITS

Albert Macovski, Massapequa, N.Y., assignor to Radio Corporation of America, a corporation of Delaware Filed July 7, 1955, Ser. No. 520,399

4 Claims. (Cl. 178—5.4)

The present invention relates to improved operation of the chrominance channel in a color television receiver.

The present color television signal includes a chrominance signal in the form of a subcarrier which has been modulated by color difference signal information to provide a suppressed-carrier modulated subcarrier signal. In the chrominance signal, color difference signal information relating to a continuous gamut of hues is included with the phase of the subcarrier related to the hues involved and the amplitude of the subcarrier related to the saturation. One or more color difference signals may be demodulated from the chrominance signal by synchronous detection wherein a locally generated synchronous demodulating signal having the phase of the desired color difference information signal in the chrominance signal is heterodyned with the chrominance signal or used to sample the chrominance signal at prescribed time intervals. A demodulated color-difference signal, when combined with a luminance signal which describes the luminance or monochrome information in the picture, yields the component color signal related to that color difference information signal. In order to make the processes of synchronous detection possible, a color synchronizing burst having the frequency of the subcarrier and a predetermined reference phase is included on the "back porch" of each horizontal synchronizing pulse in the color television signal. This burst is used to synchronize the phase of the local synchronous demodulating signal source.

During the retrace interval, a continuously operative chrominance signal demodulator can produce some undesirable functions; such as contaminating the color synchronizing burst signal with information from the local synchronous demodulating signal source in addition to causing the demodulated color synchronizing burst to be applied to the kinescope grid to cause lighting up of the horizontal retrace lines.

It is an object of this invention to provide for improved operation of the chrominance signal demodulator in a color television receiver.

It is another object of this invention to prevent signal information from a local reference signal source in a color television receiver from contaminating a color synchronizing burst.

It is another object of this invention to prevent demodulated color synchronizing burst information during the retrace interval from lighting up the horizontal retrace lines.

According to the invention, the chrominance signal demodulators in a color television receiver are turned off during at least the color synchronizing burst interval. In another form of the invention, the chrominance signal demodulators are turned off during the entire retrace interval.

Other and incidental objects of this invention will become apparent upon a reading of the following specification and a study of the drawings. Where:

Figure 1:
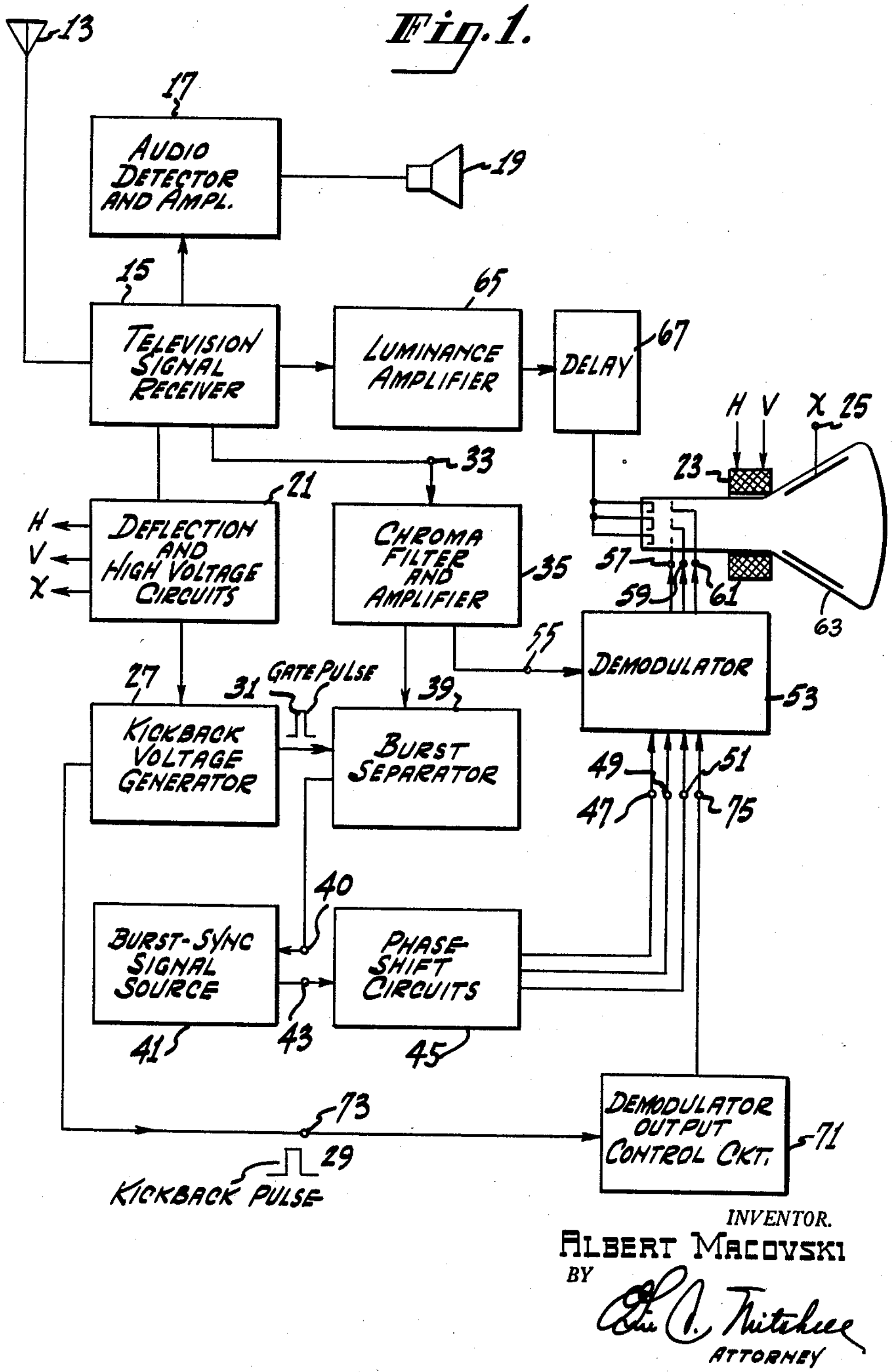
Figure 1 shows a block diagram of a color television receiver.

Figure 1 shows a block diagram of a color television receiver which utilizes one form of the present invention. The incoming color television signal modulated carrier is received at the antenna 13 and applied to the television signal receiver 15. The television signal receiver 15 performs the functions of first detection, intermediate frequency amplification and second detection and demodulates the color television signal which includes a luminance signal, a chrominance signal, picture deflection synchronizing signals, color synchronizing bursts, and sound information which is transmitted on a sound modulated carrier 4½ mc. removed from the picture carrier.

The audio or sound information may be recovered from the color television signal by use of, for example, the well-known process of intercarrier sound. This sound information is therefore detected and amplified in the audio detector and amplifier 17 and applied to the loud speaker 19.

The color television signal is applied to the deflection and high voltage circuits 21 wherein the picture deflection synchronizing signals are utilized to provide horizontal and vertical deflection signals to the yokes 23 and a high voltage signal to the ultor 25. In addition, the deflection and high voltage circuits 21 are utilized to energize a kickback voltage generator 27. The kickback voltage generator 27 may be in the form of a winding on the high voltage transformer in the deflection and high voltage circuits or may consist of one or more multivibrators or flip-flop circuits which are energized by the picture deflection synchronizing pulses. The kickback voltage generator 27 provides at least the kickback pulse 29 which has a duration interval substantially that of the horizontal retrace interval and a gate pulse 31 which has a duration interval substantially equal to and coincident with the duration interval of the horizontal synchronizing burst.

The output of the color television receiver is applied to the terminal 33, from which terminal it is impressed on the chroma filter and amplifier 35 wherein chrominance signal components of the color television signal are filtered and separated from the lower-frequency color television signal components. In one form of the television receiver, the chroma filter and amplifier 35 will separate a frequency band from approximately 2.8 to 4.2 mcs. This frequency range will also include the color synchronizing bursts which have a frequency of 3.58 mcs.

In the form of a color television receiver whose block diagram is shown in Figure 1, the color synchronizing bursts are amplified with the chrominance signal. In this way the phase relationship between the color synchronizing bursts and the color difference information signals in the chrominance signal will not be altered; in addition, the color synchronizing bursts are also increased in amplitude level. It is to be appreciated in another type of color television receiver, the color synchronizing bursts will be channelled through a signal channel different from the filter and amplifier which passes the chrominance signal.

The chrominance signal including the color synchronizing bursts from the chroma filter and amplifier 35 are impressed on the burst separator 39 to which circuit is applied the gate pulse 31. The burst separator 39, responsive to the gate pulse 31 which has a duration interval substantially coincident with that of the color synchronizing bursts, separates the color synchronizing bursts from the chrominance signal and applies the separated color synchronizing bursts to the burst-sync signal source by way of the terminal 40. The burst-sync signal source 41 may be a ringing circuit, an injection lock oscillator system, or a burst synchronized phase discriminator reactance tube controlled oscillator circuit. The output of the burst-sync signal source 41 is a continuous reference signal having the frequency of the color synchronizing bursts and a phase prescribed by the burst. This output signal is applied to the terminal 43.

The output of the burst sync signal source is applied by way of terminal 43 to the phase shift circuits 45 which provide properly phased synchronous demodulating signals to terminals 47, 49 and 51 of the demodulator 53. The demodulator 53 accepts a chrominance signal from the chroma filter and amplifier 35 by way of terminal 55 and produces a trio of color difference signals namely $R-Y$, $G-Y$ and $B-Y$ signals which are developed at the output terminals 57, 59 and 61 of the demodulator 53, from which output terminals these color difference signals are applied to the control grids of the color image reproducer 63.

The television signal in the form of a luminance signal is amplified in the luminance amplifier 65, given proper time delay in the delay line 67 and applied simultaneously to the cathodes of the color image reproducer 63. Addition of the luminance and the color difference signals is provided in the color image reproducer 63 with resulting component color signals utilized to modulate the electron beams of the color image reproducer to yield reconstruction of the transmitted color image on the image screen of the color image reproducer. It is to be appreciated that the addition of the luminance and the color difference signals can be accomplished in separate adder circuits, independent of the color image reproducer 63, without departing from the spirit of the present invention.

The kickback voltage generator 27 applies a kickback pulse 29 to the demodulator output control circuit 71 by way of terminal 73. The demodulator output control circuit 71 provides control of the output of the demodulator 53 by way of terminal 75 whereby during the retrace interval the demodulator 55 is caused to yield no output. In one form of the present invention, the disabling of the demodulator 53 during the retrace interval will also prevent any synchronous demodulating signals provided by the phase shift circuits 45 from passing to the chroma filter and amplifier 35. In this way contamination of the color synchronizing bursts by the output of the burst sync signal source 41 is avoided. One advantage of the present invention in turning off the demodulator 53 during the horizontal retrace interval is that the color synchronizing bursts will not be demodulated by the demodulators 53 thereby preventing any spurious color information due to the demodulation of the color synchronizing bursts from lighting up the retrace lines.

It is to be appreciated that the present invention may be practiced with many different types of color demodulators. Heterodyning and sampling types of synchronous demodulators have been described in detail by Pritchard and Rhodes in their paper entitled "Color Television Receiver Demodulators," published in the RCA Review, June 1953.

Figures 2, 3:
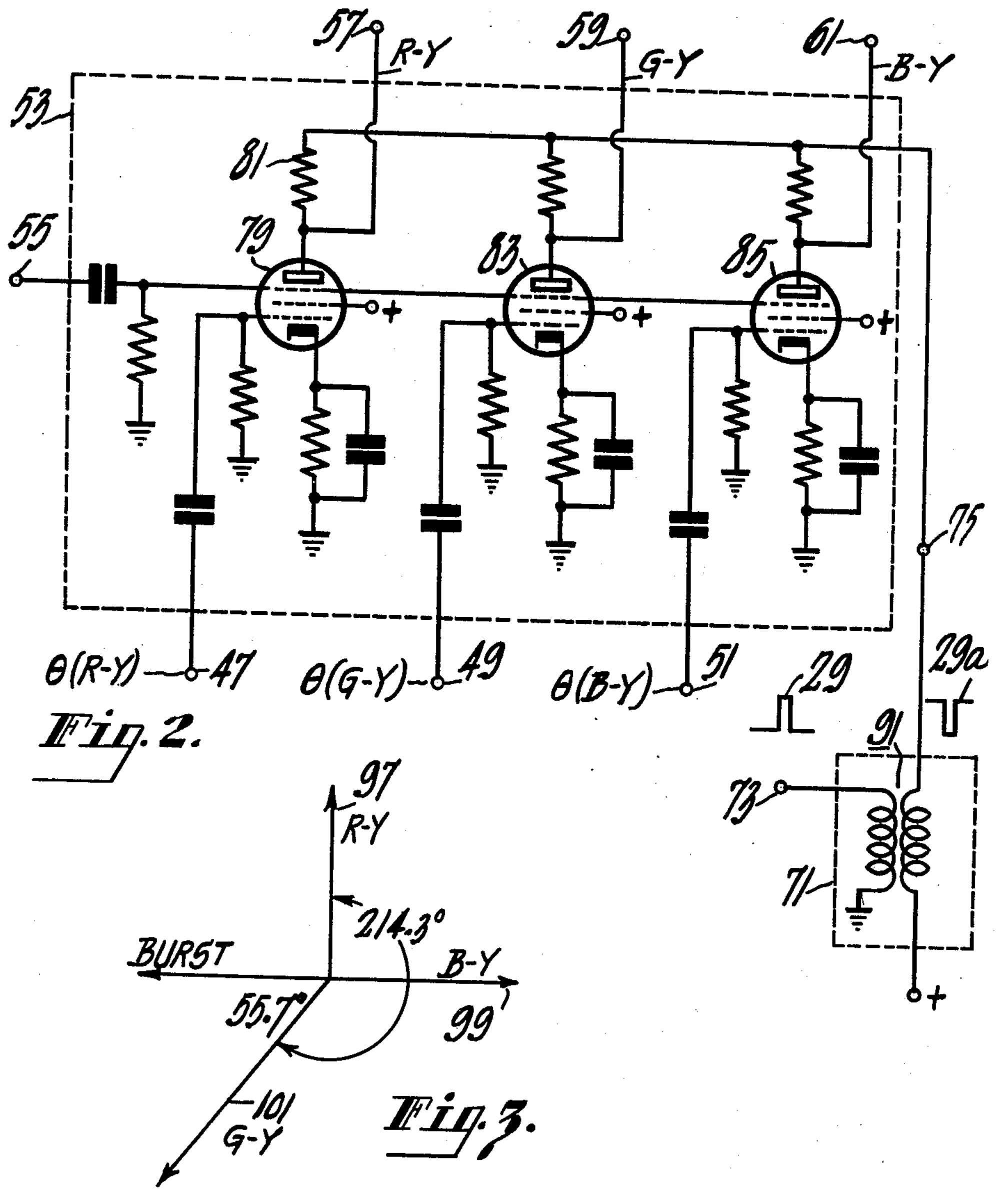
Figure 2 shows a schematic diagram of one form of the present invention.
Figure 3 shows a vector diagram of color difference signal information in the chrominance signal.

Figure 2 illustrates a schematic diagram of one form of the present invention wherein each of three color difference signals, $R-Y$, $G-Y$, and $B-Y$, are simultaneously demodulated from the chrominance signal utilizing synchronous demodulators of the type taught by Pritchard and Rhodes. In the demodulator 53 shown in Figure 2 the chrominance signal, from terminal 55, is applied to the third grid of a pentode 79. An $R-Y$ phased synchronous demodulating signal is developed at the input terminal 47 and applied to the first grid of the pentode 79. Heterodyning of the synchronous demodulating signal and the chrominance signal takes place within the pentode 79 with the resulting $R-Y$ color difference signal developed across the output load 81 and caused to appear at the output terminal 57. In like fashion, the chrominance signal is applied to the third grids of the pentodes 83 and 85 with the synchronous demodulating signals bearing the $G-Y$ and $B-Y$ phases are applied respectively to the first grids of these pentodes. Pentodes 83 and 85 are thereupon caused to provide the $G-Y$ and $B-Y$ color difference signals respectively at the output terminals 59 and 61. The demodulator output control circuit 71 in the particular embodiment shown in Figure 2 consists of a pulse transformer 91 which accepts a kickback pulse 29 at the input terminal 73 and simultaneously applies the kickback pulse 29a with proper amplitude and polarity to the anodes of each of the pentodes 79, 83 and 85 during the horizontal retrace interval. The kickback pulse 29a is developed, for example, through the plate resistor to the anode of the pentode 79; if the amplitude of the pulse 29a is sufficiently negative, the pentode 79 will be turned off during the horizontal retrace interval thereupon preventing synchronous demodulation signals from being developed by this pentode during this interval; no output signal will thereupon appear at the output terminal 57 during the duration interval of the pulse 29a. It is to be appreciated that the pulses 29a may alternatively be applied to the cathodes or the grids of the pentodes; however, if the application of these pulses to these electrodes may cause positive pulses to be formed at the anodes, these positive pulses can be prevented from lighting up the retrace lines by applying the demodulated color difference signals to the kinescope cathodes or by applying additional gating signals to the kinescope electrodes.

Figure 3 illustrates a vector diagram illustrating the phase angle between the various color difference information signals in the chrominance signal relative to the phase of the burst. It is noted from Figure 2 that the phase of the $R-Y$ color difference signal 97 lags the burst phase by 90°. The phases of the $B-Y$ color difference signal 99 and the $G-Y$ color difference signal 101 lag the burst phase by 180° and 214.3° respectively.

Figure 4:
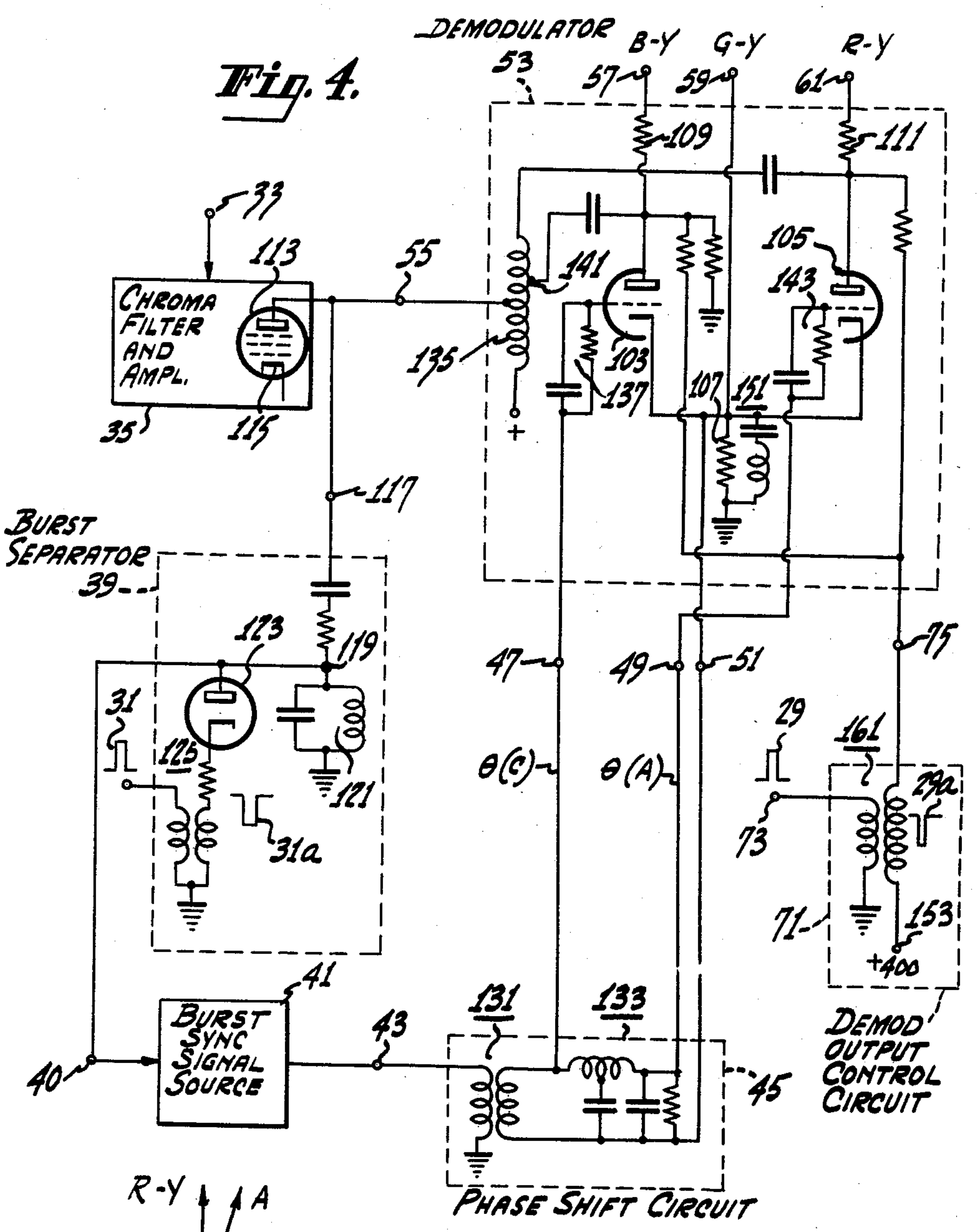
Figure 4 is a schematic diagram of another form of the invention.

Figure 4 illustrates a schematic diagram of another type of synchronous demodulator which utilizes the present invention. This synchronous demodulator 53, in Figure 4, utilizes a pair of triodes 103 and 105 whose cathodes are coupled together and "bootstrapped" off of ground by use of the resistor 107. The resistor 107 thereupon causes any signal developed by, say triode 103, to cathode-drive the triode 105 and vice versa. In addition, any output signal developed across the output resistor 109 of the triode 103 will also be developed in reversed polarity across the resistor 107; in like fashion, the output signal developed across the output resistor 111 of triode 105 will also be developed in reversed polarity across the resistor 107. The chrominance signal including the color synchronizing bursts is provided at the anode 113 of the last chroma amplifier tube 115 and delivered simultaneously to the output terminals 55 and 117. The chrominance signal and color synchronizing bursts are provided by way of terminal 117 to the burst separator 39 and caused to be developed at the offground potential terminal 119 of the resonant circuit 121. The resonant circuit 121 is a high Q circuit which is tuned to resonance at the frequency of the color synchronizing burst. A diode 123 is connected in shunt with the resonant circuit 121 with the pulse transformer 125 coupled between the cathode of the diode 123 and ground. The positive pulses 31 are thereupon applied to the cathode of the diode during the duration interval of the color synchronizing bursts; during the duration of the color synchronizing bursts, the cathode of the diode 123 is raised in potential above the anode of the diode 123 so that this diode presents substantially an open circuit across the resonant circuit 121. The color synchronizing bursts are therefore developed across this resonant circuit 121 during this time. When the pulses 31 are not present, the diode 123 presents a virtual short-circuit to the resonant circuit 121. The chrominance signal which is developed at the terminal 117 during this time, is thereupon prevented from developing any signals of significant magnitude across the resonant circuit 121.

The color synchronizing bursts which are developed across the resonant circuit are thereupon applied to the burst sync signal source 41 by way of terminal 40. The burst sync signal source 41 is thereupon caused to drive the phase shift circuits 45. The phase shift circuits 45 consist of a transformer 131 which accepts a signal from the burst sync signal source 41 by way of the terminal 43 and drives the filter circuit 133 which involves phase delay to provide signals of the phases illustrated by vectors A and C shown in Figure 5. The synchronous demodulating signals have the phases of the vectors A and C and are then applied to the terminals 47 and 49. A reference potential point of the phase shift circuits is established at terminal 51. It is noted in Figure 4 that only a pair of synchronous demodulating signals are furnished by the phase shift circuits 45. These synchronous demodulating circuits have phases which differ from the phases $R-Y$, $G-Y$ and $B-Y$ color difference signals, which have been previously discussed in connection with Figure 3. The reason for the choice of synchronous demodulating signals at phases A and C are described in detail in a succeeding paragraph.

Consider the circuit which includes the triode 103. A chrominance signal as developed across the auto transformer 135 is developed at the anode of the triode 103. A synchronous demodulating signal having the A phase relative to the burst phase is developed at the control grid of triode 103 by way of the grid leak circuit 137. The grid leak circuit 137 produces a D.-C. bias which causes the triode 103 to function as a class C device, that is, the triode 103 will conduct for an interval shorter than each ½ cycle of the synchronous demodulating wave developed at terminal 47 with the timing of this conduction corresponding to the timing of the phase of the A vector. The triode 103, since it conducts only for the brief time interval mentioned, will present an impedance to the chrominance signal between anode and cathode at a time interval corresponding to the vector having the A phase thereby developing the color difference signal information corresponding to the A phase across the triode 103. The A-phase color difference signal information developed across the load resistor 109 will also be developed across the resistor 107 in a reversed phase.

Figure 5:
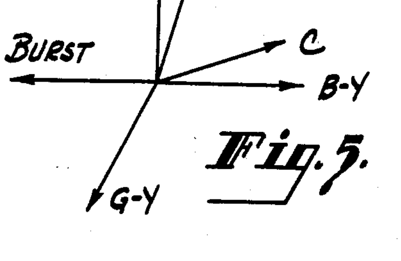
Figure 5 is a vector diagram illustrating the phase relationships of color difference signals employed in the circuit of Figure 4.

In like fashion, the chrominance signal is developed from terminal 141 of the auto transformer 135 and applied at the anode of the triode 105. A synchronous demodulated signal having the phase of the B vector in Figure 5 is developed through the grid leak circuit 143 to the control grid of triode 105 to cause triode 105 to operate class C with a timing corresponding to the phase of the C vector. Color difference signal information having the phase of the C vector will thereupon be developed across the load resistance 111 and in reversed phase across the resistance 107.

Since the resistor 107 provides means whereby each of the triodes 103 and 105 drives the other, it follows therefore that the synchronous demodulation provided by triode 103, thereupon causing a reversed phase version of the A vector color difference signal information to be developed across resistor 107, will also cause a prescribed magnitude of reversed-phase A phase color difference signal information to appear across the output resistor 111 which will be in addition to the C-phase color difference signal information developed there. In like fashion a prescribed magnitude of reversed-phase C-phase color difference signal information will also be developed across the output resistor 109 in addition to the A phase color difference signal information developed there by the triode 103. The A phase and the reversed-phase C phase color difference signals developed across the resistor 109 will add vectorially to produce an $R-Y$ signal which will appear at the output terminal 57. The C phase and the reversed-phase A phase color difference signal developed across the output resistance 111 will add vectorially to produce a $B-Y$ color difference signal. The reversed phase A and C phase color difference signals produced across the resistance 107 will add vectorially to produce a $G-Y$ color difference signal which is developed at the output terminal 59. It is noted that a series resonant trap 151, placed in shunt with resistance 107, is utilized to shunt the chrominance signal from the cathodes of the triodes 103 and 105 to ground so that the chrominance signal developed across either the triodes 103 or 105 will not drive the other of these triodes. The anodes of triodes 103 and 105 derive their D.-C. potential from the terminal 153 in the demodulator output control circuit 71. If the potential derived from this terminal is applied continuously to the triodes 103 and 105, synchronous demodulation by the demodulator 53 will take place continuously. However, the pulse transformer 161 is connected between the potential terminal 153 and the anodes of the triodes 103 and 105. The kickback pulse 29 having a duration interval of the horizontal retrace interval is applied to the input terminal 73. The developed kickback pulses *29a* will be negatively detected and will serve to decrease the potential on the anodes of the triodes 103 and 105 during the horizontal retrace interval to an extent whereby these triodes are turned off.

As a result of the triodes 103 and 105 in the demodulator 53 being turned off during the horizontal retrace interval, it follows that the color synchronizing bursts cannot be detected during the horizontal retrace interval to cause spurious information to be developed at the output terminals 57, 59 and 61 nor can synchronous demodulating signal information yielded by the phase shift circuits 45 be caused to be fed back through the chroma filter and amplifier 35 into the burst separator 39 where this synchronous demodulating signal information would contaminate the color synchronizing bursts separated there and provide erroneous phase information to the burst sync signal source 41.

Having described the invention, what is claimed is:

1. In a color television receiver adapted to receive a color television signal including a chrominance signal occurring during line scanning intervals and having frequency components in a prescribed frequency range of said color television signal and also color synchronizing bursts occurring during each picture retrace interval and having a frequency in said prescribed frequency range, the combination of: a chroma filter having a passband comprising said prescribed frequency range and having an output circuit; means to apply said color television signal to said chroma filter to develop said chrominance signal and said color synchronizing bursts at said output circuit; means to derive from said bursts an alternating current wave having a frequency and phase synchronized by said bursts; a color demodulator comprising an electron discharge device and including a first and second signal input terminal and a control terminal and an output circuit, said electron discharge device being normally conducting and capable of developing a color information signal at said output circuit responsive to said chrominance signal and to said alternating current wave applied to said first and second signal input terminals, respectively, and capable of being cut off in response to the application of a pulse of negative polarity and of prescribed magnitude to said control terminal, said inoperativeness persisting for the duration interval of each pulse; means to apply said chrominance signal from said output circuit to said first signal input terminal; means to apply said alternating current wave from said deriving means to said second signal input terminal; means to apply pulses of negative polarity and of prescribed magnitude and occurring in time coincidence with each burst to said control terminal to cut off said electron discharge device during said bursts.

2. In a color television receiver adapted to receive a color television signal including a chrominance signal occurring during line scanning intervals and having frequency components in a prescribed frequency range of said color television signal and also color synchronizing bursts occurring during each picture retrace interval and having a frequency in said prescribed frequency range, the combination of: a chroma filter having a passband comprising said prescribed frequency range and having an output circuit, means to apply said color television signal to said chroma filter to develop said chrominance signal and said color synchronizing bursts at said output circuit, means to derive from said color synchronizing bursts an alternating current wave having a frequency and phase synchronized by said bursts, a color demodulator including an electron discharge device having a first and second input circuit, a control circuit and an output terminal, said electron discharge device being normally operative to develop a color information signal at said output terminal in response to the application of said chrominance signal and said alternating current wave to said first and second input circuits, respectively, and capable of being rendered inoperative for a prescribed time interval responsive to a pulse having a prescribed time interval applied to said control circuit, means to apply said chrominance signal and said alternating current wave to said first and second input circuits respectively, pulse generating means to generate pulses occurring during each retrace interval in time coincidence with said bursts, and means to apply said pulses to said control circuit to render said electron discharge device inoperative during each burst.

3. In a color television receiver comprising a source of composite color television signals including a chrominance signal comprising a modulated color subcarrier and also including a color synchronizing component comprising bursts of oscillations of color subcarrier frequency, the combination comprising a common amplifying channel for such chrominance signal and said color synchronizing component having an output terminal at which amplified versions of said chrominance signal and said color synchronizing components appear, burst separating means coupled to said output terminal and responsive to the amplified signal versions appearing thereat, said burst separating means comprising a periodically actuated gate for selectively passing substantially only said color synchronizing component to a burst separator output terminal, means coupled to said burst separator output terminal and responsive to the selectively passed color synchronizing component for supplying reference oscillations of color subcarrier frequency and synchronized in phase with said bursts to a reference output terminal, a color demodulator comprising an electron discharge device having first and second input circuits and an output circuit, passive circuit elements coupling said first input circuit to said common amplifying channel output terminal, means for coupling said second input circuit to said reference output terminal, means for rendering said electron discharge device normally conducting such that said electron discharge device operates to demodulate said modulated color subcarrier to develop a color information signal in said output circuit, means for generating periodically recurring pulses occurring during time periods encompassing the time periods occupied by said bursts, and means for applying said pulses to said electron discharge device so as to render said electron discharge device non-conducting during the occurrence of said bursts.

4. Apparatus in accordance with claim 3 also including a color image reproducing device having a control grid, means for normally rendering said color image reproducing device conducting, and wherein said electron discharge device includes an output electrode coupled to said output circuit, wherein said pulses generating means develops pulses of negative polarity, wherein said pulse applying means applies said pulses of negative polarity to said output electrode, and wherein said output electrode is directly coupled to said control grid.

References Cited in the file of this patent

UNITED STATES PATENTS

| | | |
|---|---|---|
| 2,318,197 | Clark | May 4, 1943 |
| 2,644,030 | Moore | June 30, 1953 |
| 2,713,607 | Rhodes | July 19, 1955 |
| 2,715,155 | Bryan | Aug. 8, 1955 |
| 2,744,155 | Kihn | May 1, 1956 |
| 2,835,728 | Flood et al. | May 20, 1958 |

OTHER REFERENCES

RCA, Color Television Receiver, Model CT-100, Circuit Diagram, pages 32 and 33, March 1954.

A Two-Color Direct View Receiver for the R.C.A. Color Television System, November 1949.